United States Patent
Townsend

(10) Patent No.: US 6,345,652 B1
(45) Date of Patent: *Feb. 12, 2002

(54) SEPARATOR FOR LUMBER STACKING

(76) Inventor: David M. Townsend, R.R. #2, Langton, Ontario (CA), N0E 1G0

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,070

(22) Filed: Sep. 28, 1998

Related U.S. Application Data

(62) Division of application No. 08/566,733, filed on Dec. 4, 1995, now Pat. No. 5,813,137.

(30) Foreign Application Priority Data

Aug. 23, 1995 (CA) .............................................. 2156761

(51) Int. Cl.[7] ................................................ B27M 1/00
(52) U.S. Cl. ..................... 144/371; 144/2.1; 144/136.1; 144/242.1; 144/245.1; 144/246.1; 144/116; 144/117.1; 144/230
(58) Field of Search ............................. 144/2.1, 114.1, 144/116, 117.1, 136.1, 242.1, 245.1, 246.1, 248.6, 363, 371, 230

(56) References Cited

U.S. PATENT DOCUMENTS

| | | | | |
|---|---|---|---|---|
| 4,429,726 A | * | 2/1984 | Betzler | 144/230 |
| 4,512,114 A | * | 4/1985 | Theien | 144/116 |
| 4,842,029 A | * | 6/1989 | De Abreu | 144/116 |
| 5,002,104 A | * | 3/1991 | Stewart | 144/230 |

* cited by examiner

*Primary Examiner*—W. Donald Bray
(74) *Attorney, Agent, or Firm*—Pillsbury Winthrop LLP Intellectual Property Group

(57) ABSTRACT

This invention relates to an improved separator, commonly referred to as a "lath", "stick", "sticker", or "crosser", that is used in the lumber industry to separate pieces of lumber in a stack or bundle. The separator features, in one embodiment, a plurality of grooves traversing the length of the separator to permit air circulation within the grooves, and a plurality of ridges between the grooves to support the pieces of lumber. In another embodiment, a second plurality of grooves traverse the length of the separator and the first grooves to form a cross-hatching of grooves to permit air circulation within the grooves, and forming a plurality of protrusions to support the pieces of lumber over the grooves.

2 Claims, 4 Drawing Sheets

SEPARATOR FOR LUMBER STACKING

This application is a division of Ser. No. 08/566,733 filed Dec. 4, 1995 U.S. Pat. No. 5,813,137.

BACKGROUND OF THE INVENTION

This invention relates a device that is commonly referred to as a "lath", "stick", "sticker", or "crosser" (referred to here as a "separator") that is used in the lumber industry to separate pieces of lumber in a stack, bundle or lift or the like (hereafter referred to as a "stack"). More particularly, the invention relates to an improvement in such a lath to augment air circulation within a lumber stack and to reduce staining of lumber.

In the lumber industry timber is cut into boards or lumber which are usually stacked in a shed or kiln to dry before shipping. Stacking may also be used to maintain lumber during shipping or storage. The boards in a stack are usually separated by separators running transversely to the length of the boards. An individual stack is often built up to a height of about 5 feet with the boards laid in a spaced and parallel relationship in courses, course upon course, with separators laid between the courses across the boards. Individual stacks may be piled on one another to create larger stacks for efficient storage using spacer blocks between the individual stacks. The spacer blocks are usually larger than a common separator lath (4"×4" as opposed to 1"×1") but are usually made of the same material, ie. low grade lumber such as spruce. The difference in size of the separators is not material to this invention. Therefore, spacer blocks are also included within the meaning of the term separator, where the context permits, in this specification. Drying air circulates in the spaces between the boards in each course and in the spaces provided by the separators between the boards of adjacent courses and between individual stacks.

An imprint or stain, sometimes called a "shadow" or "sticker stain", may be left on a board in an area where it has been in contact with a separator in a stack. Such staining may be partly due to the percolation of sugars and other chemicals from the separators to the lumber. It is also understood that staining may result from the fact that air cannot penetrate to the board surface covered by a separator to dry the wood and mould or spores grow in the residual moisture. A stain may be visible immediately after removal of a board from the stack or it may show later during finishing or staining of the wood. It renders lumber unmerchantable for certain end uses and sometimes is the cause of costly claims to mills from customers. It is a significant problem in the lumber industry, particularly with light coloured woods.

Attempts to solve this problem have been directed at minimizing the contact area between a separator and the lumber in a stack. For example, U.S. Pat. No. 3,907,130 entitled "KILN STICKER" that issued to D. Hutcheson on Sep. 23, 1975, disclosed a plastic separator for drying wood with a curved upper surface and a lengthwise groove along its bottom surface to reduce the area of contact. One disadvantage of this design is that a lengthwise groove does not facilitate circulation of air through the groove. End to end circulation along the long length of a separator through a small cross section groove is inefficient. Consequently, the groove provides a protected area for mould and spores to cultivate. Another disadvantage is that equipment for manufacturing plastic separators is foreign to a lumber mill so a mill would need to buy prefabricated plastic separators from a remote factory. Manufacturing costs, transportation costs, availability, maintaining separator inventory at a mill and other factors augured against use of plastic separators and they did not replace the more common and readily available wooden separators.

Nevertheless, the lengthwise groove design to reduce contact area was adopted in the industry, but in wooden separators. It is not uncommon now to find wooden separators cut with top and bottom lengthwise grooves forming an "H" shaped cross section. The "H" separator reduces contact area and utilizes the wood resources of a mill but suffers the same disadvantage of poor air circulation along the long narrow grooves. The manufacture of such wooden separators may use equipment ordinary to a mill, but cutting lengthwise grooves requires close tolerances and straight separators to maintain the alignment of a groove to the long axis of a narrow separator. Further, manufacturing many separators may require many tools or many runs through the same tools.

It is an object of this invention to provide an improved separator for separating lumber that provides reduced contact area between the separator and the lumber, improved air circulation and permits simple manufacture without close tolerances using equipment commonly found at a mill. It is also an object of this invention to disclose elements to adapt a common plane or other apparatus to manufacture such improved separators. The disclosure of the invention is made in terms of wooden separators, because these are believed to be best suited to the lumber industry, but it will be appreciated by skilled persons that this disclosure is also suitable to and intended for separators manufactured from other suitable materials such as plastic except that the preferred manufacturing process may be unsuitable for some other materials.

GENERAL DESCRIPTION OF THE INVENTION

The improved separator of this invention comprises a separator having a length to span across one or more pieces of lumber in a course and a height to separate the courses sufficiently for air circulation between the courses and having a plurality of grooves traversing the length of the separator to permit air circulation within the grooves. Since the grooves run across a short width of a separator rather than along its length, air circulation through the grooves is much improved over the prior art long groove separators. The grooves may run perpendicularly to the length of the separator or, diagonally, at an angle to the length. The spacing between grooves is not critical although close spacing reduces the contact area between grooves. In a preferred embodiment, the grooves are spaced to present sharp peaks between them thus minimizing the contact area with the lumber. In a preferred embodiment, grooves are cut with sharp peaks spaced about ¾ of an inch apart and at a 60° angle to the long axis of the separator. Similar grooves are cut in the top and the bottom surfaces of the separator to touch the boards in the lumber stack. In another embodiment, grooves are cut at a 60° angle to the longitudinal axles of the separator in one direction and then cut again in an opposite direction to provide intersecting grooves. The ridges between the first run of grooves are cut by the traversing set of second grooves resulting in diamond shaped protrusions which further reduce the amount of surface area in contact with the lumber and provides for additional circulation. It will be appreciated that separator size, groove spacing and contact area should be sufficient to support the weight of the stack without denting the lumber to render it unmerchantable, but this aspect of design is within the skill of the art and will not be discussed in detail in this specification. It is similar to the design of a bed of nails that supports a heavy body with a delicate surface on sharp points on the principle that many points will support the weight of the body with little pressure on each point.

Manufacture of such separators is relatively easy. Since the grooves run transversely to the length of the separator there is no difficulty aligning the narrow separator to a tool during manufacture. Close tolerances are not necessary nor are multiple tools required. The separators may be cut in an ordinary plane fitted with a serrated blade that forms grooves and peaks as separators are passed sideways through the plane. The angle at which the separators pass through the plane determines the angle of the grooves to the long axis of the separator. The angle is not critical nor is consistency of the angle between separators, thus it is unnecessary to maintain close tolerances in the feeding process. The manufacture also has the advantage that it can be used to clean and renew old dirty separators for reuse as improved separators of this invention. Thus it is not necessary for a lumber mill to discard its inventory of separators to use this invention.

DESCRIPTIONS OF THE FIGURES

In the figures which illustrate a preferred embodiment of this invention:

DESCRIPTION OF THE PREFERRED EMBODIMENTS

Figure 1:
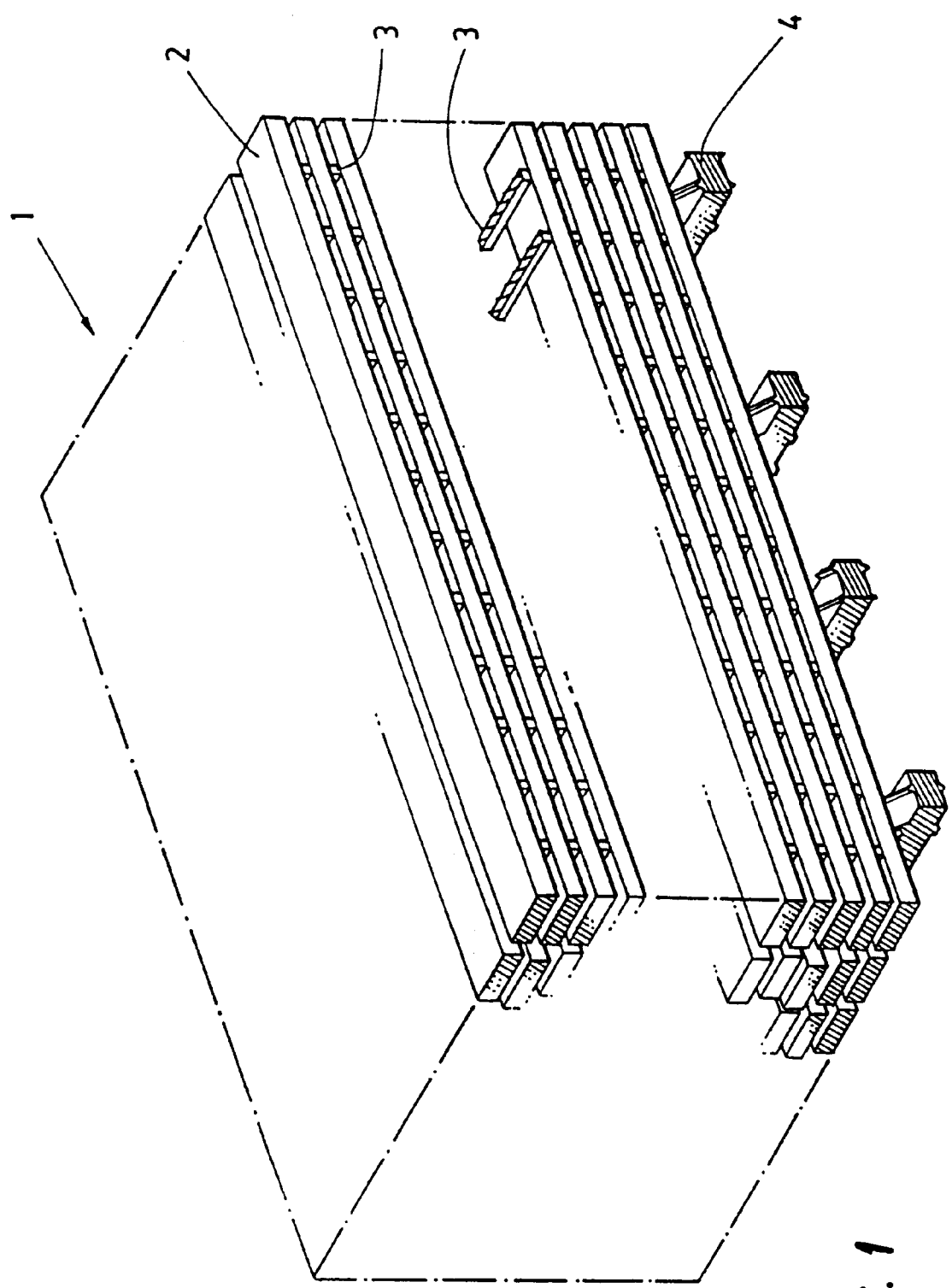
FIG. 1 is a perspective view of a stack of lumber separated by separators.

FIG. 1 illustrates a stack 1 comprising boards 2 laid in courses upon separators (laths) 3. The stack 1 is supported upon separators (blocks) 4. Other similarly constructed stacks may be placed upon stack 1 to create a larger stack, tens of feet high. The stack 1 is constructed for the purpose of air drying the boards or maintaining a dry condition. The lath separators 3 and the block separators 4 shown in FIG. 1 have diagonal grooves and ridges to reduce the amount of the separator in contact with the boards and to provide easy access for air circulation.

Figure 2:
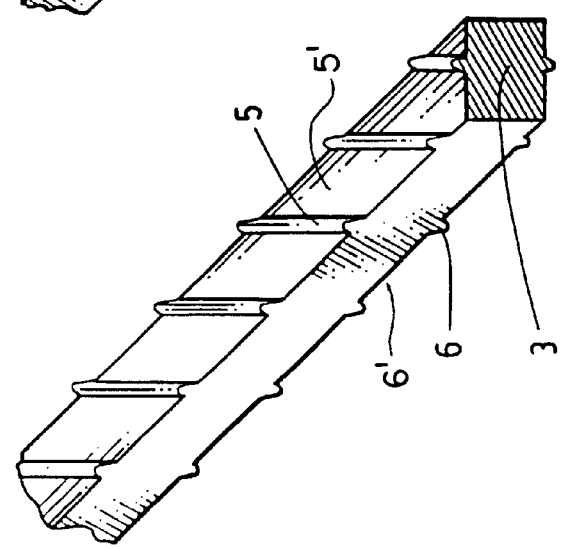
FIG. 2 is a perspective view of an improved separator having diagonal grooves.

FIG. 2 illustrates a preferred embodiment of the improved separator 3 of this invention having diagonal ridges 5 on its top surface and similar diagonal ridges 6 on its bottom surface. There is no specific angle at which the ridges 5 or 6 must cross the length of the separator 3 in order to be effective for the purposes of this invention. The ridges 5 may run at a different angle to the ridges 6 and it is not critical to this invention that the ridges 5 are each exactly parallel to one another or that the ridges 6 are each exactly parallel to one another. The main objectives are to obtain numerous short grooves 5', 6' to facilitate air circulation and sufficient ridges to support the lumber. However, parallel grooves 5', 6' and ridges 5, 6 on each surface are likely to result from mass manufacturing techniques described hereafter.

Figure 3:
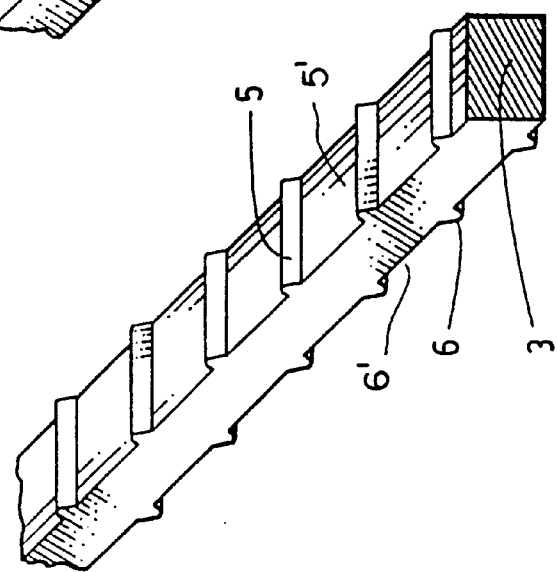
FIG. 3 is a perspective view of an improved separator having grooves at right angles to the long axis of the separator.

FIG. 3 illustrates another example of an improved separator of this invention in which the ridges 5 and 6 are cut perpendicular to the length of the separator. This might be an ideal cut for it will have the shortest grooves 5', 6' to permit good air circulation and the shortest ridges 5,6 in contact with the lumber, but it is unlikely to result from the manufacture described hereafter unless guides are used to closely control the feeding of separators to the plane. It is not necessary to do this to obtain the utility of the invention.

Figure 4:
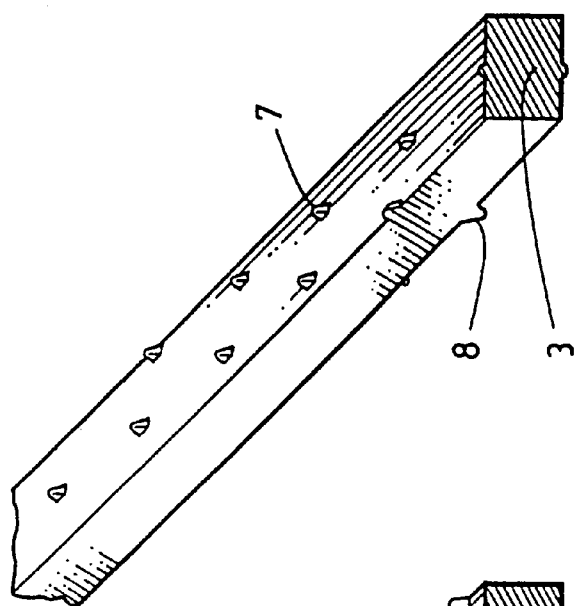
FIG. 4 is a perspective view of an improved separator having two sets of traversing diagonal grooves on each of its top and bottom surfaces.

FIG. 4 illustrates a different embodiment of this invention in which each separator 3 is passed through the cutting tool twice on each side in opposite directions so that on the first pass a ridge 5 will be formed whereas on the second pass a protrusion 7 will remain being the intersection point of two such ridges 5 on the same surface. Similarly, protrusions 8 may be formed on the bottom surface.

Figure 5:
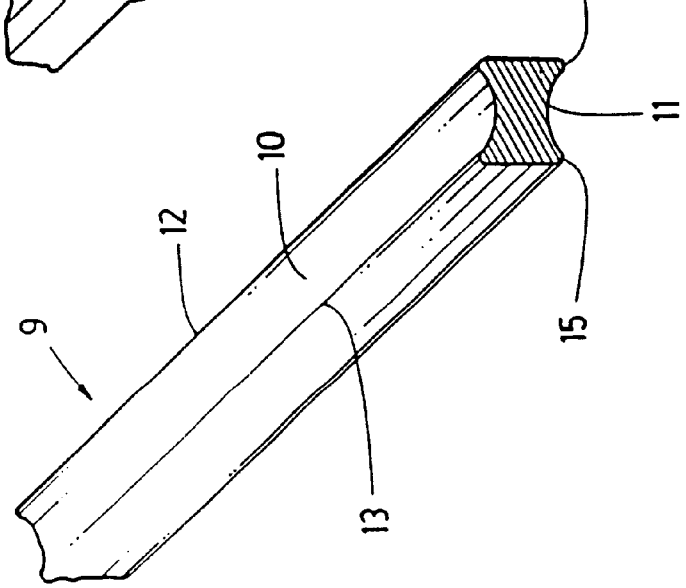
FIG. 5 is an "H" shaped separator of the prior art.

FIG. 5 illustrates a prior art H-shaped separator 9 which has grooves 10 and 11 cut along its top and bottom surfaces centrally and parallel to the long axis of the separator 9. A separator of this construction reduces contact with the lumber because the upward protruding ridges 12 and 13 and the corresponding lower ridges 14 and 15 are the only contact with the lumber. But air circulation through the long grooves 10 and 11 is inefficient.

Figure 7:
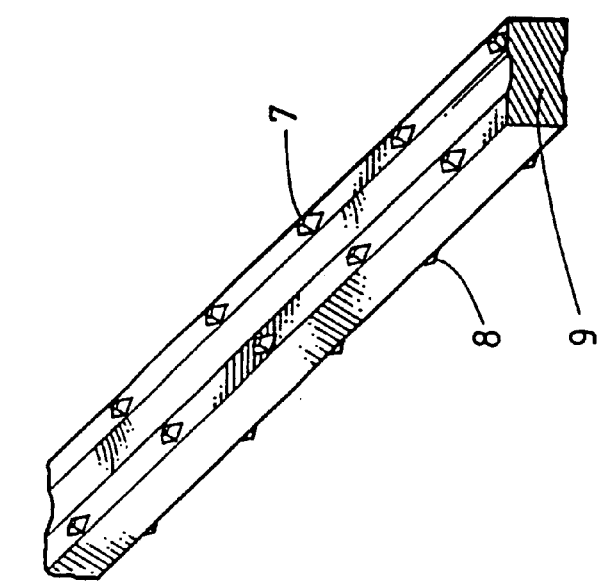
FIG. 7 is a perspective view of an H-shaped separator modified to become an improved separator of this invention having intersecting grooves.
Figure 6:
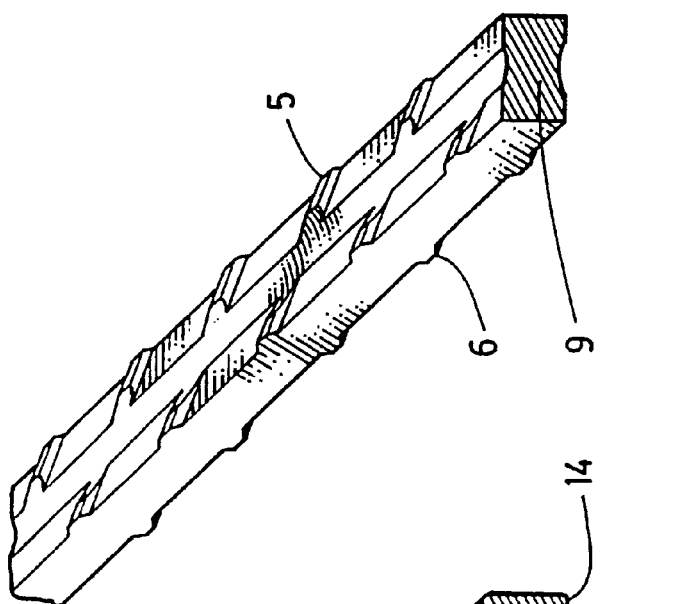
FIG. 6 is a perspective view of an H-shaped separator modified to become an improved separator of this invention.

FIGS. 6 and 7 illustrate that an H-shaped separator may be adapted to become an improved separator of this invention. FIG. 6 illustrates the H-shaped separator 9 of FIG. 5 after having diagonal ridges 5 and 6 cut in its top and bottom surfaces through its ridges 12, 13, 14 and 15. FIG. 7 illustrates the H-shaped separator 9 after having two intersecting ridges 5 cut through the ridges 12, 13, 14 and 15 on its top and bottom surfaces to form protrusions 7 and 8.

Figure 8:
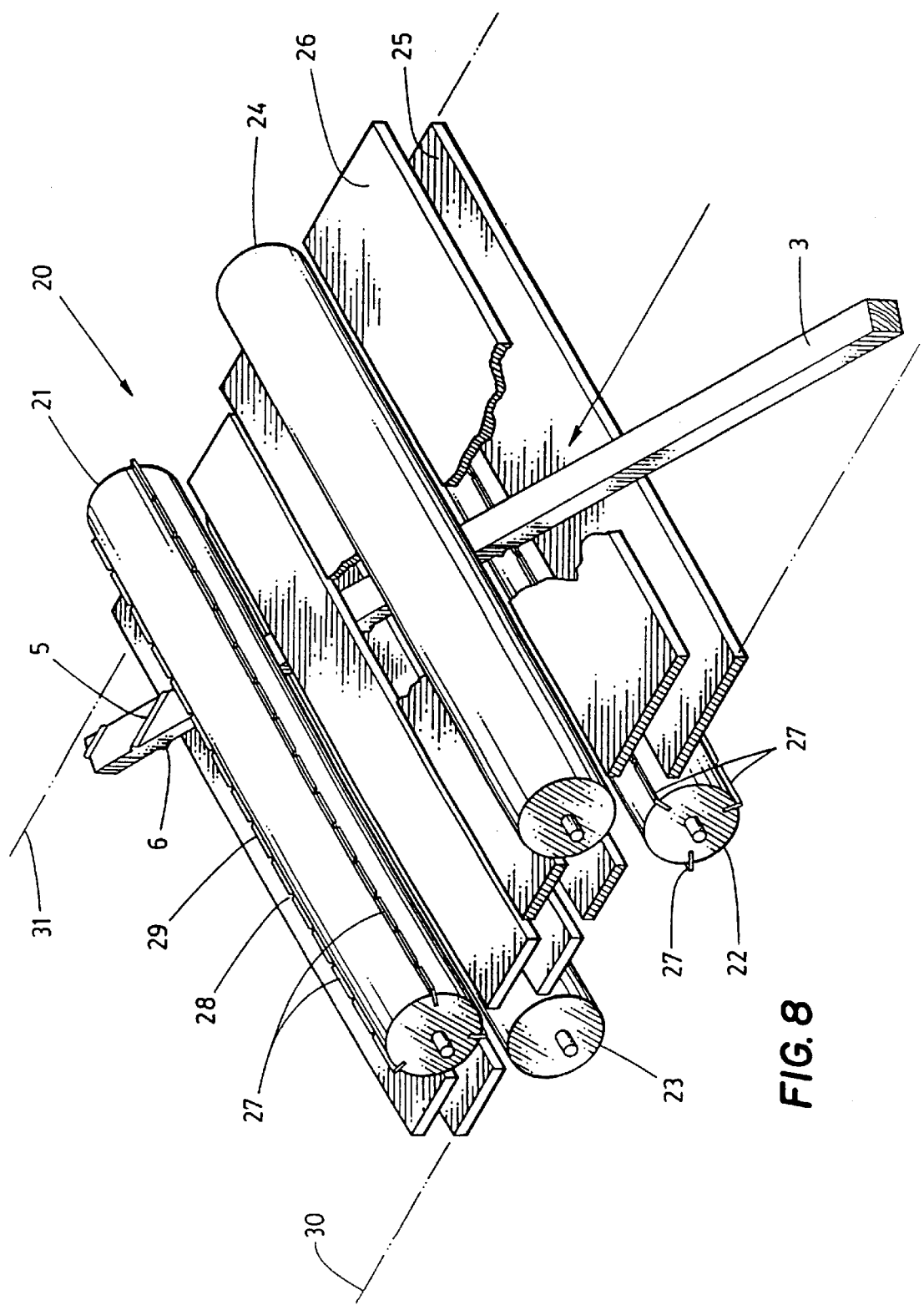
FIG. 8 is a partial view of a plane fitted with a serrated blade to manufacture separators of this invention.

FIG. 8 illustrates a planing machine ("plane") 20 having a top cutting drum 21 and a bottom cutting drum 22 and drums 23 and 24, respectively, in opposition to cutting drums 21 and 22. A bottom plane surface 25 and a top plane surface 26 form a structure for sliding a separator 3 into the plane 20 for cutting. Each of the cutting drums 21 and 22 is fitted with cutting blades 27 in a conventional manner. Each blade 27 is serrated with indentations 28 and protrusions 29. The protrusions 29 cut into a separator 3 to form the grooves 5', 6' between the ridges 5,6 while the indentations 28 form the profile of each ridge 5,6. It will be appreciated that the grooves 5', 6' between ridges 5,6 and the profile of the ridges 5,6 may be adjusted by altering the shape of the indentations 28 and the protrusions 29. As illustrated in FIG. 2, the ridges 5 may have a curved profile; as illustrated in FIG. 3, a triangular profile; or, as illustrated in FIG. 6, a trapezoid profile. The particular shape of the profile is not material to the broad principle of this invention but may be relevant to support the air flow design for particular uses. It may also be appreciated that the ridges 5,6 may not all have exactly the same profile because of the irregularities in the wood or in the cutting tool. Some ridges 5,6 may have a triangular profile while others on the same separator may have a trapezoid profile because of irregularity in the surface of the wood limits the exposure to the cutting tool. Essentially the groove 5',6' and ridge 5,6 design will depend upon providing sufficient ridge 5,6 depth to permit air to circulate between the separator 3 and a board 2 and providing a shape that will minimize surface contact while providing sufficient support for the lumber in the stack and to avoid denting of the boards 2 by the ridges 5 or 6. It has been found that ⅝ of an inch between ridges 5 or 6 and a ridge height of about ⅛ of an inch with a triangular profile is suitable.

The embodiments of FIGS. 2, 3 and 6 may be constructed by passing a separator through a plane to cut ridges 5 and 6 in its top and bottom surfaces. The angle of the ridges 5,6 to the length of the separator will be limited in one direction by the outside guides 30 and 31 of the plane and the length of the separator. Where separators are shorter than the distance between the outside guides 30 and 31, the angle of the cuts is at the discretion of the operator.

The embodiments in FIGS. 4 and 7 may be constructed by passing a separator through the plane 20 twice in opposition directions to make opposing cuts to form the protrusions 7 and 8. It is not critical to this invention that the opposing cuts be made at any particular angle to one another, however, it will be appreciated that each of the opposing cut should transverse the other at a sufficient angle to leave adequate material to form protrusions 7 and 8. Similar comments may be made about the profile of protrusions 7 and 8 as were made about the ridges 5 and 6.

In the manufacturing operation, many separators may be placed side by side and passed through the planer 20. It will be appreciated that one of the advantages of this invention is the low, requirement for close tolerances. The angle of entry of a separator into the planer 20 is not critical as long as the cut is transverse to the length of the separator. It is also not critical that the ridges 5,6 of one separator be parallel to the ridges 5,6 of another separator. Moreover, manufacturing tolerances are quite wide. Accordingly, rough and ready manufacture of the improved separator of this invention is possible in a lumber yard.

The preferred method of manufacturing the improved separator of this invention comprises the steps of fitting serrated cutters into the cutting drums of a conventional planing machine, feeding separators through the plane and using the serrated blades to cut grooves and ridges in the top and/or bottom surfaces of the separator.

The description of the preferred embodiments of this invention is not intended to limit the general scope of the principle of this invention as it will be appreciated by a person skilled in the art and having read the disclosure and the claims as a whole.

What is claimed is:

1. An apparatus to cut grooves in a plurality of separators, comprising:
   a cutting mechanism having at least one cutting drum with a serrated blade; and
   a feeding mechanism to feed said separators at an angle relative to their length into said cutting mechanism, said feeding mechanism including a sliding structure having a top plane surface and a bottom plane surface to slideably support said separators,
   wherein said serrated blade of said cutting mechanism cuts grooves at said angle in at least one of a top and bottom surface of said separators.

2. A method of manufacturing improved separators, comprising:
   fitting a planing apparatus with a feeding mechanism and one or more serrated blades, said feeding mechanism including a sliding structure having a top plane surface and a bottom plane surface to slideably support said separators, said serrated blades containing a plurality of protrusions to cut grooves into said separators and containing a plurality of indentations to form ridges on said separators;
   feeding one or more separators, slideably supported by said support structure, at an angle relative to their length into said planing apparatus; and
   cutting grooves and ridges at said angle in at least one of a top and bottom surface of said separators with said serrated blades.

* * * * *